United States Patent
Wang

(10) Patent No.: US 7,590,771 B2
(45) Date of Patent: Sep. 15, 2009

(54) CHIP WITH IDE HOST AND IDE SLAVE AND CORRESPONDING SELF-DEBUGGING FUNCTION

(76) Inventor: Roy Wang, c/o 8F, No. 533, Chung-Cheng Rd., Hsintien, Taipei Hsien (TW)

( * ) Notice: Subject to any disclaimer, the term of this patent is extended or adjusted under 35 U.S.C. 154(b) by 141 days.

(21) Appl. No.: 11/282,439

(22) Filed: Nov. 17, 2005

(65) Prior Publication Data

US 2006/0123140 A1   Jun. 8, 2006

Related U.S. Application Data

(60) Provisional application No. 60/630,533, filed on Nov. 22, 2004.

(30) Foreign Application Priority Data

Nov. 3, 2005   (TW) .............................. 94138540 A

(51) Int. Cl.
  *G06F 3/00* (2006.01)
(52) U.S. Cl. .......................................... 710/14; 710/38
(58) Field of Classification Search .................... 710/14
  See application file for complete search history.

(56) References Cited

U.S. PATENT DOCUMENTS

| | | | | |
|---|---|---|---|---|
| 6,442,208 | B1* | 8/2002 | Horiguchi et al. | 375/257 |
| 6,516,428 | B2* | 2/2003 | Wenzel et al. | 714/28 |
| 6,732,311 | B1* | 5/2004 | Fischer et al. | 714/737 |
| 2002/0181588 | A1* | 12/2002 | Okada | 375/240.12 |
| 2004/0205430 | A1* | 10/2004 | Kimura et al. | 714/724 |

* cited by examiner

*Primary Examiner*—Henry W.H. Tsai
*Assistant Examiner*—Kris Rhu
(74) *Attorney, Agent, or Firm*—Perkins Coie LLP

(57) ABSTRACT

A chip with IDE host and IDE slave and corresponding self-debugging function is provided. The chip simplifies IDE debugging of a chip, which comprises a front-end and a backend, by offering separate debugging modes for an IDE host and an IDE slave on the same chip. The front-end provides output data of an internal IDE slave or output data of an external IDE slave in response to a host debug enable signal. The backend is coupled to the front-end. The backend provides functions of an internal IDE host according to the output data of the internal IDE slave or the external IDE slave, or directs the output data of the internal IDE slave to an external IDE host in response to a slave debug enable signal.

20 Claims, 4 Drawing Sheets

CHIP WITH IDE HOST AND IDE SLAVE AND CORRESPONDING SELF-DEBUGGING FUNCTION

CROSS-REFERENCE TO RELATED APPLICATION

This application claims the priority benefits of U.S. provisional application titled "DVD APPARATUS AND OPERATION" filed on Nov. 22, 2004, Ser. No. 60/630,533. All disclosure of this application is incorporated herein by reference. This application also claims the priority benefit of Taiwan application serial no. 94138540, filed on Nov. 3, 2005.

BACKGROUND OF THE INVENTION

1. Field of the Invention

The present invention relates to a chip with IDE (Integrated Drive Electronics) debugging function. More particularly, the present invention relates to a chip with an IDE host and an IDE slave, and self-debugging function.

2. Description of the Related Art

In some devices such as DVD (digital versatile disc) players, some functions come from the cooperation of a front-end and a backend. The front-end is a DVD servo module, which provides MPEG (motion picture expert group) bit streams obtained from a DVD disc. The backend is an MPEG decoder, which decodes MPEG bit streams into video and audio signals. Usually, the front-end is an IDE slave and the backend is an IDE host.

For reasons such as lower cost and smaller chip size, it is desirable to fabricate an IDE host and an IDE slave on the same chip. One related problem is, in such chips, that the host and the slave have to be debugged together. Without isolated debugging, the debugging process tends to be complex and difficult. Therefore, it is desirable to have a chip, which has an IDE host and an IDE slave fabricated together, and offers isolated debugging of the IDE host and the IDE slave.

SUMMARY OF THE INVENTION

Accordingly, the present invention is directed to a chip that simplifies IDE debugging by offering separate debugging modes for an IDE host and an IDE slave on the same chip.

According to an embodiment of the present invention, a chip with IDE host and IDE slave and corresponding self-debugging function is provided. The chip comprises a front-end and a backend. The front-end provides output data of an internal IDE slave or provides output data of an external IDE slave in response to a host debug enable signal. The backend is coupled to the front-end. The backend provides functions of an internal IDE host according to the output data of the internal IDE slave or the external IDE slave, and directs the output data of the internal IDE slave to an external IDE host in response to a slave debug enable signal.

In an embodiment of the present invention, the backend further comprises a first switch and the internal IDE host. The first switch directs the output data of the internal IDE slave to the internal IDE host or to the external IDE host in response to the slave debug enable signal. The internal IDE host provides its functions according to the output data of the internal IDE slave received from the first switch and the output data of the external IDE slave received from the front-end.

In an embodiment of the present invention, the front-end further comprises the internal IDE slave and a second switch. The internal IDE slave provides its output data to the backend. The second switch provides the output data of the external IDE slave to the backend in response to the host debug enable signal.

In an embodiment of the present invention, when the chip is in an integrated mode, the internal IDE host receives the output data of the internal IDE slave.

In an embodiment of the present invention, when the chip is in a slave debug mode, the external IDE host receives the output data of the internal IDE slave.

In an embodiment of the present invention, when the chip is in a host debug mode, the internal IDE host receives the output data of the external IDE slave.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
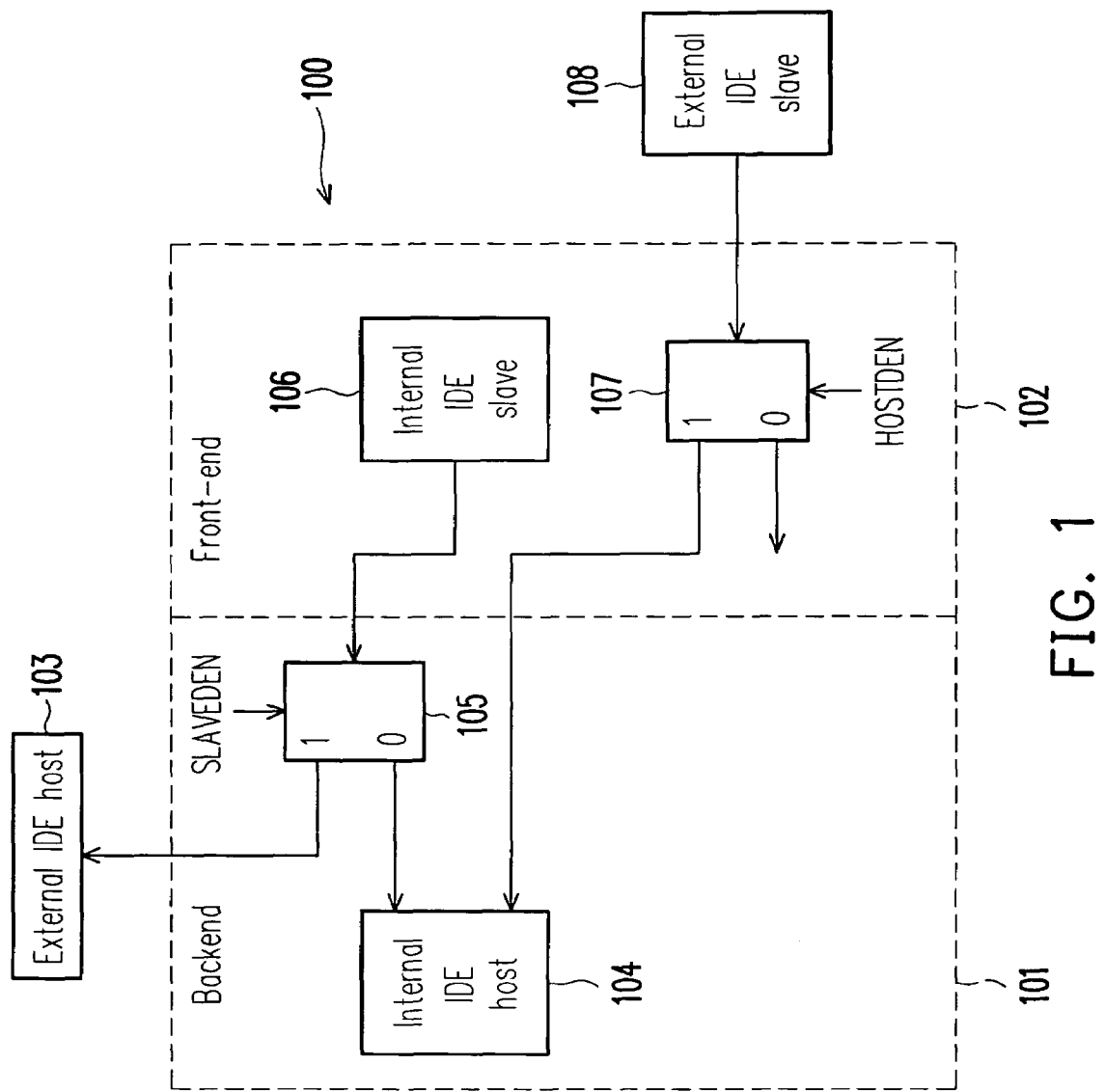
FIG. 1 is a schematic diagram showing a chip with IDE host and IDE slave and corresponding self-debugging function according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Please refer to FIG. 1. FIG. 1 is a schematic diagram showing the chip 100 with IDE host and IDE slave and corresponding self-debugging function according to an embodiment of the present invention. The chip 100 comprises the backend 101 and the front-end 102, which are fabricated together on the chip 100. In brief, the front-end 102 provides output data of the internal IDE slave 106 and/or provides output data of the external IDE slave 108 in response to the host debug enable signal HOSTDEN. The backend 101 is coupled to the front-end 102. The backend 101 provides functions of the internal IDE host 104 according to the output data of the internal IDE slave 106 and/or the external IDE slave 108. The backend 101 also directs the output data of the internal IDE slave 106 to the external IDE host 103 in response to the slave debug enable signal SLAVEDEN.

The front-end 102 comprises the internal IDE slave 106 and the switch 107. The internal IDE slave 106 provides its output data to the backend 101. The switch 107 provides the output data of the external IDE slave 108 to the backend 101 in response to the host debug enable signal HOSTDEN. In this embodiment, the switch 107 provides the output data of the external IDE slave 108 when the host debug enable signal HOSTDEN is high, and ignores the output data of the external IDE slave 108 when the host debug enable signal HOSTDEN is low.

The backend 101 comprises the switch 105 and the internal IDE host 104. The switch 105 directs the output data of the internal IDE slave 106 to the internal IDE host 104 or to the external IDE host 103 in response to the slave debug enable signal SLAVEDEN. In this embodiment, the switch 105 directs the output data of the internal IDE slave 106 to the external IDE host 103 when the slave debug enable signal SLAVEDEN is high, and directs the output data of the internal IDE slave 106 to the internal IDE host 104 when the slave debug enable signal SLAVEDEN is low. The internal IDE host 104 provides its functions according to the output data of the internal IDE slave 106 received from the switch 105 and the output data of the external IDE slave 108 received from the front-end 102.

In this embodiment, the internal IDE host 104 and the external IDE host 103 are MPEG decoders, which decode MPEG bit streams. The internal IDE slave 106 is a DVD servo module. The external IDE slave 108 is a DVD-ROM player. Both the internal IDE slave 106 and the external IDE slave 108 provide MPEG bit streams read from storage media such as DVD.

Apart from normal operation, the chip 100 has to offer two separate debugging modes, one for the internal IDE slave 106, and the other for the internal IDE host 104. Therefore, the chip 100 has three operating modes: the integrated mode, the slave debug mode and the host debug mode. In short, the integrated mode is the normal operation. The slave debug mode is for the separate debugging of the internal IDE slave 106. The host debug mode is for the separate debugging of the internal IDE host 104. The operating modes are described in details below.

Figure 2:
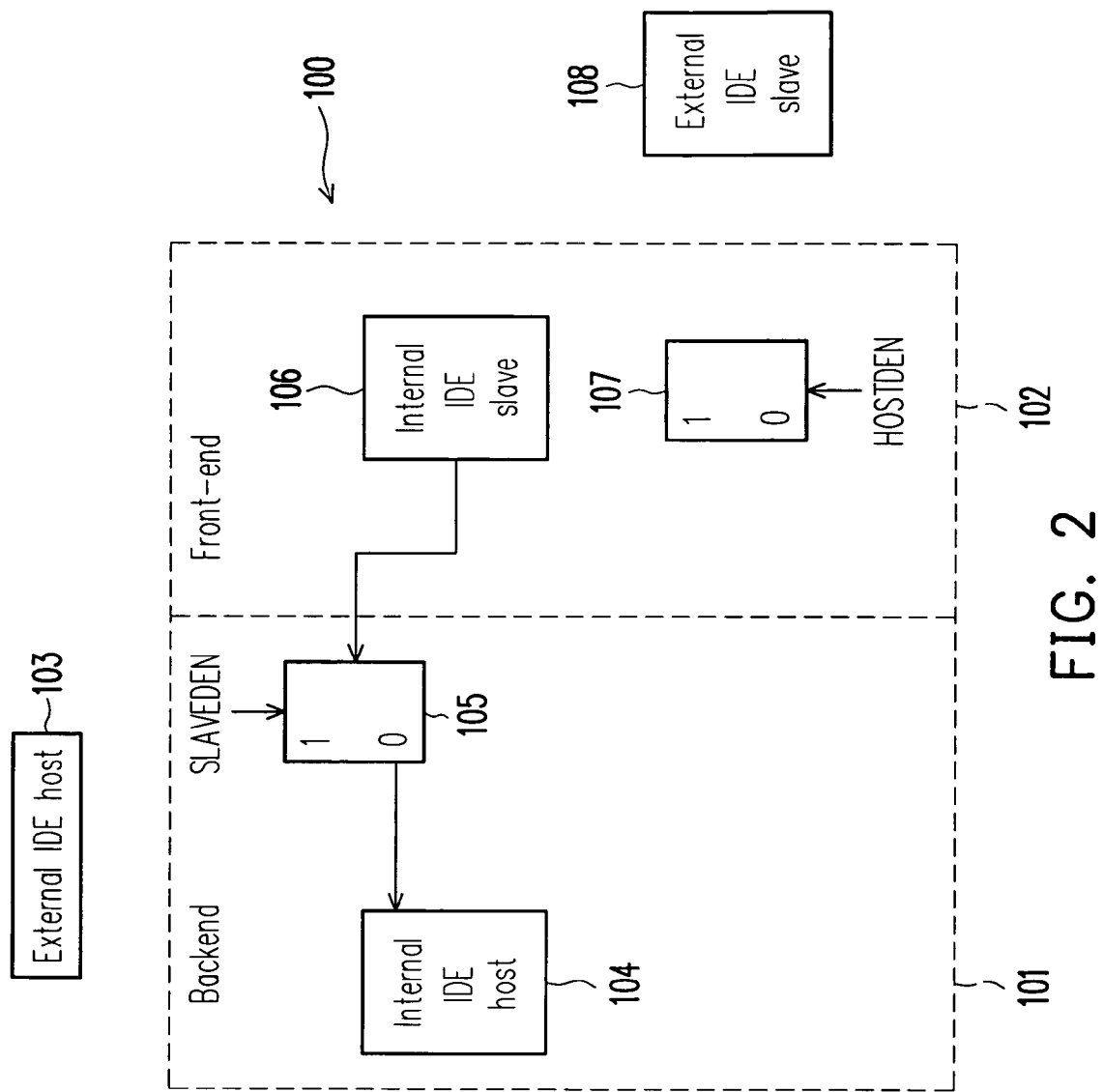
FIG. 2 is a schematic diagram showing the data flow of the chip in FIG. 1 when the chip is in the integrated mode.

When the chip 100 is in the integrated mode, the slave debug enable signal SLAVEDEN is low, and the host debug enable signal HOSTDEN is also low. The data flow is shown in FIG. 2. In the integrated mode, the switch 105 switches the MPEG bit stream from the internal IDE slave 106 to the internal IDE host 104, and the external IDE slave 108 is inactive. Therefore, the internal IDE host 104 receives and decodes the MPEG bit stream from the internal IDE slave 106. This is the normal operation of the chip 100. No debugging is involved.

Figure 3:
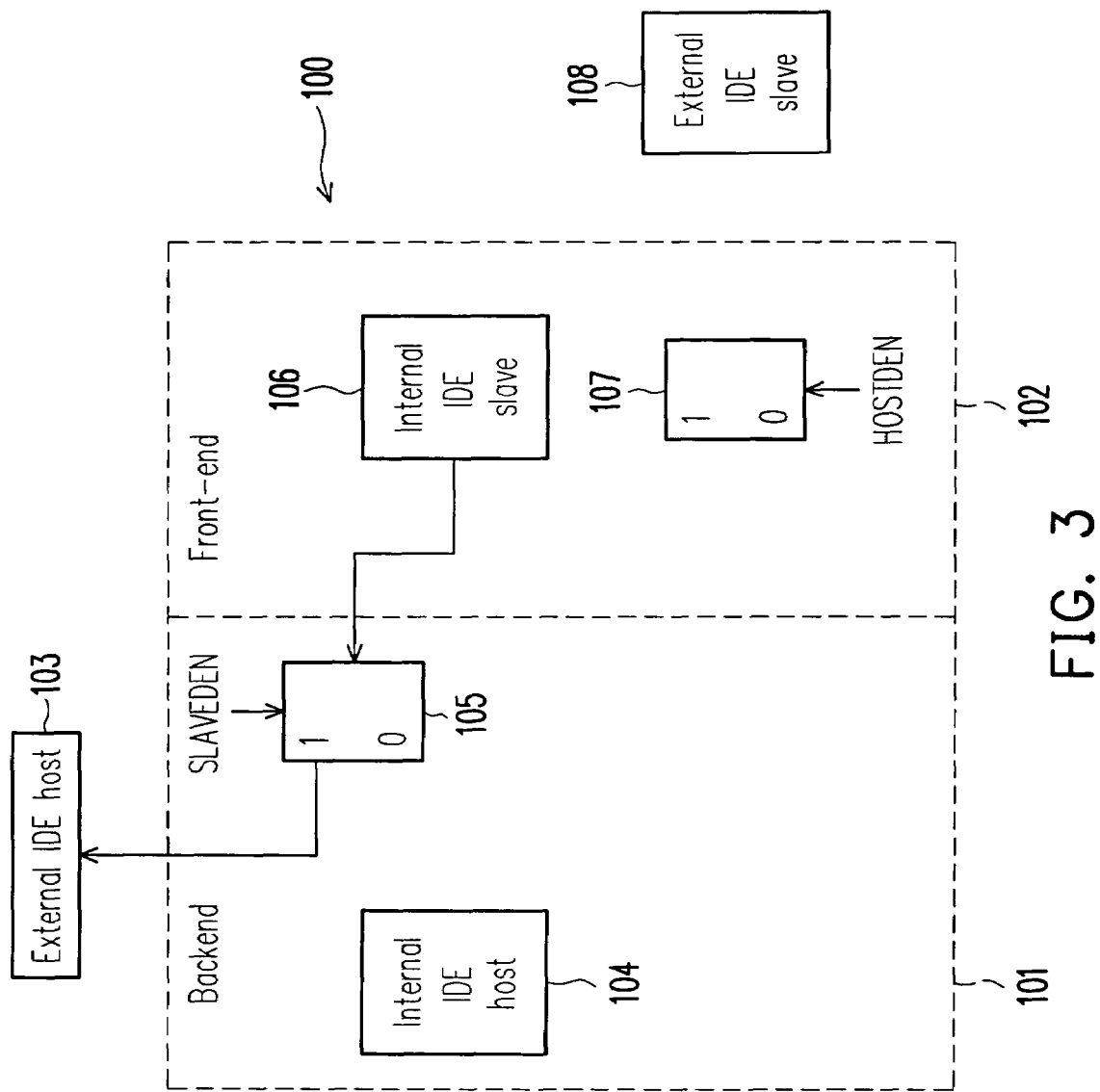
FIG. 3 is a schematic diagram showing the data flow of the chip in FIG. 1 when the chip is in the slave debug mode.

When the chip 100 is in the slave debug mode, the slave debug enable signal SLAVEDEN is high, and the host debug enable signal HOSTDEN is low. The data flow is shown in FIG. 3. In the slave debug mode, the switch 105 switches the MPEG bit stream from the internal IDE slave 106 to the external IDE host 103, and the external IDE slave 108 is inactive. Therefore, the external IDE host 103 receives and decodes the output data of the internal IDE slave 106. As long as the external IDE host 103 functions correctly, the internal IDE slave 106 can be debugged separately without the interference of the internal IDE host 104.

Figure 4:
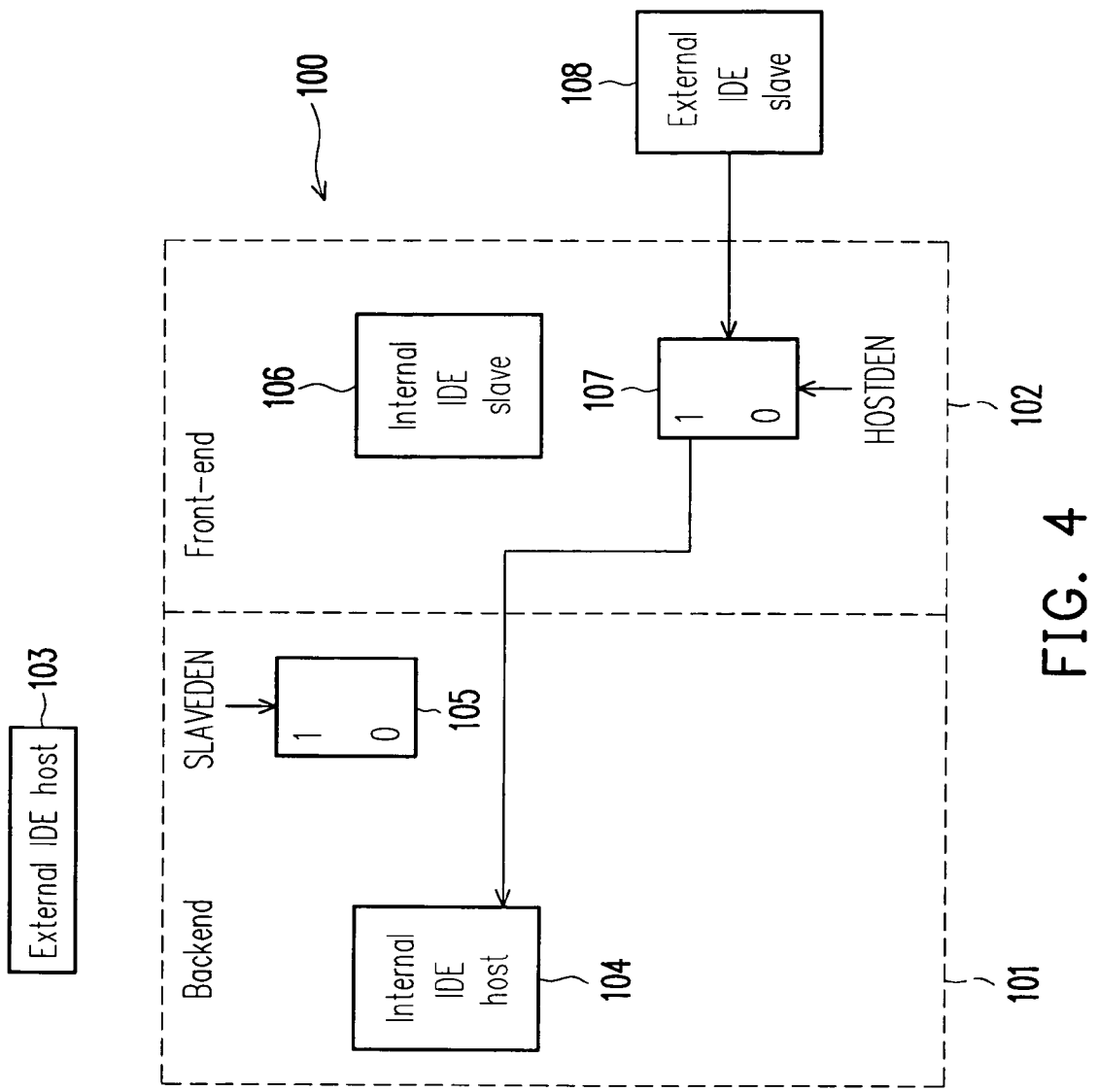
FIG. 4 is a schematic diagram showing the data flow of the chip in FIG. 1 when the chip is in the host debug mode.

When the chip 100 is in the host debug mode, the slave debug enable signal is SLAVEDEN low, and the host debug enable signal HOSTDEN is high. The data flow is shown in FIG. 4. In the host debug mode, the switch 107 switches the MPEG bit stream from the external IDE slave 108 to the internal IDE host 104, and the internal IDE slave 106 is inactive. Therefore, the internal IDE host 104 receives and decodes the output data of the external IDE slave 108. As long as the external IDE slave 108 functions correctly, the internal IDE host 104 can be debugged separately without the interference of the internal IDE slave 106.

As can be seen in the discussions above, the chip 100 in this embodiment of the present invention provides separate debugging modes for an IDE host and an IDE slave on the same chip. It is the separate debugging modes that simplifies IDE debugging. Clearly, the separate debugging modes provide the way to separately debug different parts of a chip which has an IDE host and an IDE slave fabricated together, and then the debugging process tends to be simple and easy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A chip comprising an IDE host and an IDE slave, the chip comprising:
    a front-end that provides output data of an internal IDE slave if a host debug enable signal is at a first specified level and output data of an external IDE slave if the host debug enable signal is at a second specified level that is different from the first specified level; and
    a backend, coupled to the front-end, that receives the output data provided by the front-end and provides functions of an internal IDE host responsive to the output data received from the front-end if a slave debug enable signal is at a third specified level and directs the received output data to an external IDE host if the slave debug enable signal is at a fourth specified level that is different from the third specified level.

2. The chip of claim 1, wherein the backend further comprises:
    a first switch that directs the output data of the internal IDE slave to the internal IDE host or to the external IDE host in response to the slave debug enable signal; and
    the internal IDE host that is configured to provide its functions according to the output data of the internal IDE slave received from the first switch and the output data of the external IDE slave received from the front-end.

3. The chip of claim 2, wherein the first switch directs the output data of the internal IDE slave to the external IDE host if the slave debug enable signal is high, and directs the output data of the internal IDE slave to the internal IDE host if the slave debug enable signal is low.

4. The chip of claim 1, wherein the front-end further comprises:
    the internal IDE slave that is configured to provide its output data to the backend; and
    a second switch that is configured to provide the output data of the external IDE slave to the backend in response to the host debug enable signal.

5. The chip of claim 4, wherein the second switch provides the output data of the external IDE slave if the host debug enable signal is high.

6. The chip of claim 1, wherein if the chip is in an integrated mode, the internal IDE host receives the output data of the internal IDE slave.

7. The chip of claim 6, wherein if the chip is in the integrated mode, the slave debug enable signal is low and the host debug enable signal is low.

8. The chip of claim 1, wherein if the chip is in a slave debug mode, the external IDE host receives the output data of the internal IDE slave.

9. The chip of claim 8, wherein if the chip is in the slave debug mode, the slave debug enable signal is high, and the host debug enable signal is low.

10. The chip of claim 1, wherein if the chip is in a host debug mode, the internal IDE host receives the output data of the external IDE slave.

11. The chip of claim 10, wherein if the chip is in the host debug mode, the slave debug enable signal is low and the host debug enable signal is high.

12. The chip of claim 1, wherein the internal IDE host is an MPEG decoder.

13. The chip of claim 1, wherein the external IDE host is an MPEG decoder.

14. The chip of claim 1, wherein the internal IDE slave is a DVD servo module.

15. The chip of claim 1, wherein the external IDE slave is a device capable of providing an MPEG bit stream.

16. The chip of claim 15, wherein the external IDE slave is a DVD-ROM player.

17. The chip of claim 1, wherein the backend and the front-end are fabricated on the same chip.

18. A self-debugging method performed by a chip having an integrated front-end and a backend, the method comprising:

receiving a host debug enable signal;

receiving a slave debug enable signal;

if the slave debug enable signal is raised, providing output from an internal IDE slave to an external IDE host, and otherwise, if the slave debug signal is not raised, providing output received from a front-end to an internal IDE host; and if the host debug enable signal is raised, providing output from an external IDE slave to an internal IDE host, and otherwise, if the host debug enable signal is not raised, providing output from the front-end to the backend.

19. A chip comprising an IDE host and an IDE slave, the chip comprising:

means for receiving a host debug enable signal;

means for receiving a slave debug enable signal;

means for providing output from an internal IDE slave to an external IDE host when the slave debug enable signal is raised;

means for providing output received from a front-end to an internal IDE host when the slave debug signal is not raised;

means for providing output from an external IDE slave to an internal IDE host when the host debug enable signal is raised; and means for providing output from the front-end to the backend when the host debug enable signal is not raised.

20. The chip of claim 19 wherein the means for receiving a host debug signal and the internal IDE slave are both associated with the front-end of the chip, and the means for receiving the slave debug signal and the internal IDE host are both associated with the backend of the chip.

* * * * *

UNITED STATES PATENT AND TRADEMARK OFFICE
CERTIFICATE OF CORRECTION

PATENT NO. : 7,590,771 B2
APPLICATION NO. : 11/282439
DATED : September 15, 2009
INVENTOR(S) : Roy Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 290 days.

Signed and Sealed this

Twenty-first Day of September, 2010

David J. Kappos
*Director of the United States Patent and Trademark Office*